Feb. 28, 1939. J. IONESCO ET AL 2,148,814
CAMERA, CHIEFLY FOR CINEMATOGRAPHS
Filed Sept. 9, 1937  2 Sheets-Sheet 1
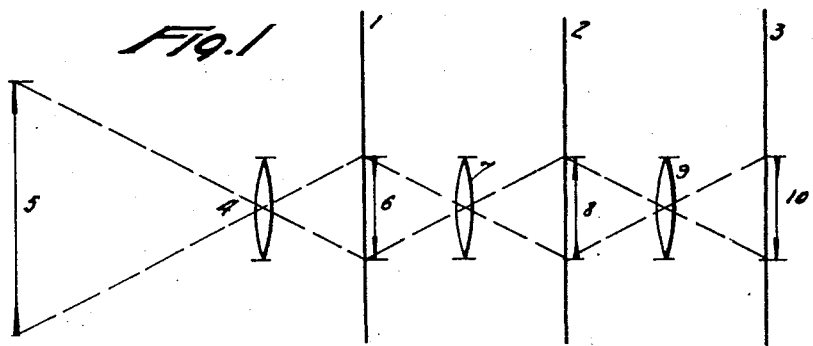
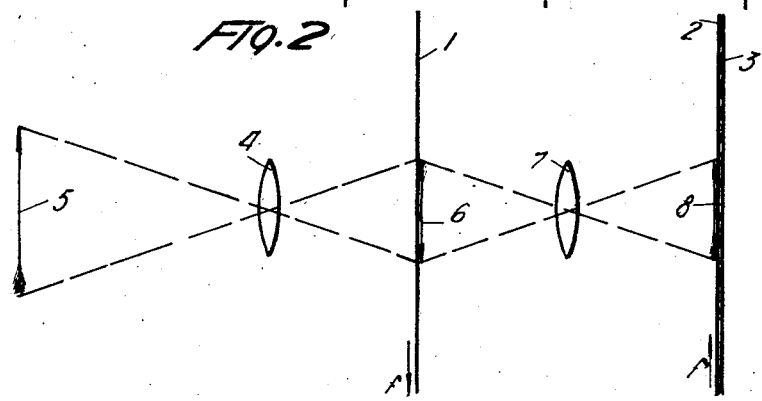
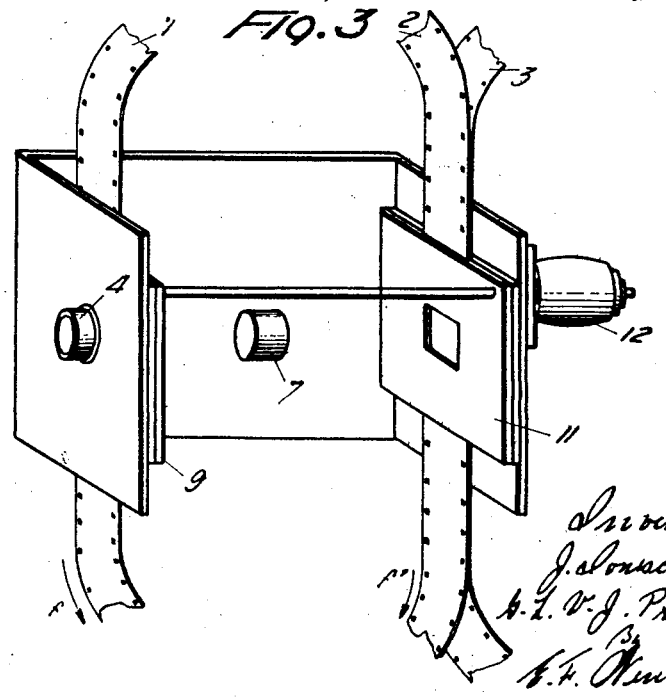

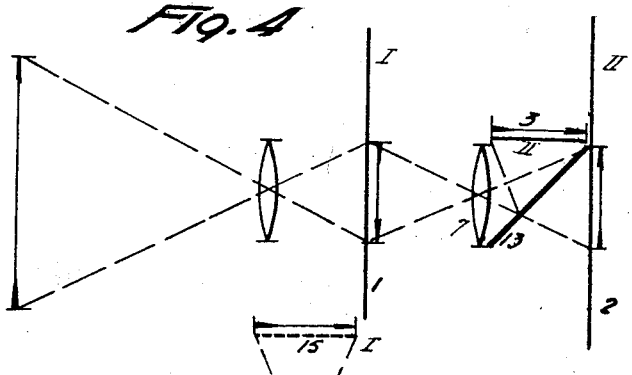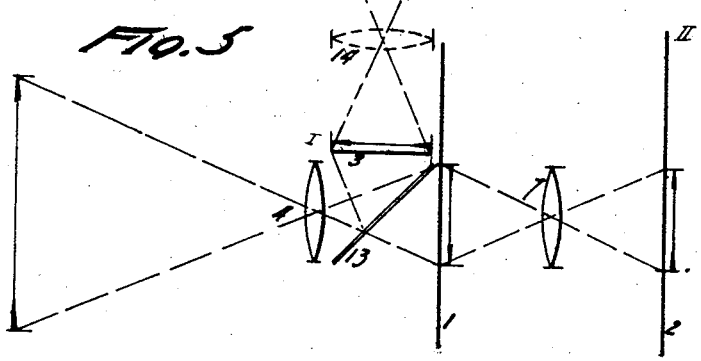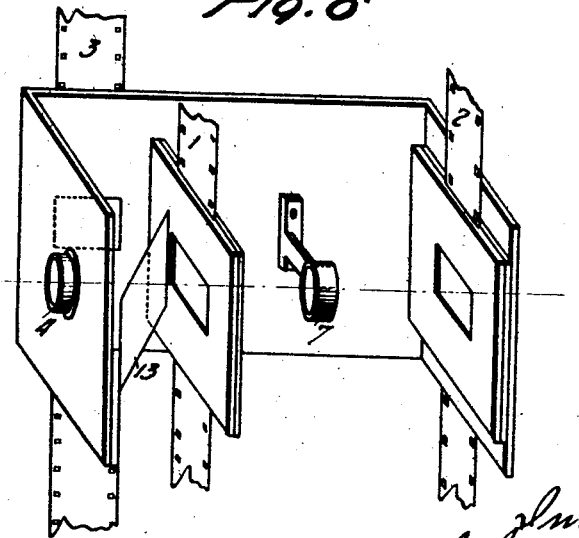

Patented Feb. 28, 1939

2,148,814

UNITED STATES PATENT OFFICE 2,148,814

CAMERA, CHIEFLY FOR CINEMATOGRAPHS

Jean Ionesco, Munich, Germany, and Georges Lucien Victor Joseph Prouvot, Roubaix, France Application September 9, 1937, Serial No. 163,134 In Germany September 15, 1936

8 Claims. (Cl. 88—16.4)

According to a known process of view taking for cinematographic color projection, a number of simultaneous recordings of the object is made on different films with the use either of chromatic selecting filters of different colours or of films the emulsions of which are of different kinds, so as to be sensitive each to a light of a different color; two or three colors are generally sufficient. These films, after development form the negatives which correspond to the chosen colors say blue, yellow and red.

In order to work satisfactorily and to provide clear and fringeless pictures these processes require during view taking the effects of parallaxis to be corrected, which is difficult to obtain.

Our invention has for its object to remove this drawback and to obtain several color-selected films adapted to become positives or negatives and all carrying pictures which are exactly similar. To this end we arrange the films to be impressed in the path of a light beam; a first picture of the object is made on the film which is the first to the front. This picture seen through transparency is reproduced preferably without any change in size on the next film by means of a suitable optic device and so on. The movement of the films is performed in the same direction or in opposed directions according as to whether the pictures carried by them are in the same sense or not one with reference to the others.

Several means may be provided for improving and simplifying the general principle of our invention.

In the first place we may replace a film by a double or so-called bipack film which comprises two films applied one against the other and passing together in the guideway arranged in front of the corresponding optic device. In the second place we may divide the light beam to the front or to the rear of the first picture, for instance by means of a semi-transparent mirror so as to obtain a complementary image.

We have shown by way of example in accompanying drawings and described hereinafter different forms of execution of our invention.

Fig. 1 illustrates diagrammatically in the more general case the path followed by the light rays and the manner in which the pictures are formed.

Fig. 2 relates to the method of producing the pictures for a three-color view taking in the case of the use of a bipack film.

Fig. 3 shows diagrammatically a view taking apparatus for executing the method disclosed with reference to Fig. 2.

Figs. 4 and 5 illustrate the production of the pictures according to two modifications.

Lastly Fig. 6 shows diagrammatically a view taking apparatus for the execution of the method disclosed with reference to Fig. 5.

Returning to Fig. 1, it is apparent that there are arranged a plurality of films 1, 2, 3, one behind the other. An ordinary object-glass 4 forms on the film 1 a picture 6 of the object 5 (said image 6 being shown in Fig. 1 behind the film). The rays passing out of a point of the object 5 are condensed by the object glass 4 on to a point of the film 1 and pass through the latter which is transparent. They are then taken up again by the optic system 7 which condenses them again so as to form on the film 2 a second picture 8 identical with the former picture 6. Similarly it is possible to obtain on the film 3 a further identical picture 10.

Each film or the screen accompanying it arrests the rays of the color corresponding to it and plays thus with reference to the following films the part of a chromatic filter.

Obviously whatever the transparency of the film 1 may be, this film will absorb a certain amount of light. The same is the case for the film 2. The pictures 6—8—10 will consequently show decreasing luminosities.

For this reason and also because of the number of optic systems involved, the arrangement of Fig. 1 is more or less theoretical.

Preferably we use the arrangement of Fig. 2 in which the films 2 and 3 are joined so as to form a bipack film, films 1 and 2 being transparent. Under these circumstances the picture 8 which is shown in front of the bipack film 2—3 is formed in practice on the surface of separation of the films 2 and 3 so as to appear on the two sensitive surfaces facing one another.

The optic arrangement 7, shown diagrammatically as a single lens, may be of any kind. It is generally of advantage to make use of an object glass which may set the picture straight if required. It is also possible, without widening the scope of the invention, to use any other simple or compound optic system such as a mirror, a prism or the like means playing the same part i. e. forming on the second film 2—3 a picture identical with the picture 6; to this end the optic system 7 is adjusted so that these pictures 6 and 8 may be of equal sizes which will be sufficient to make them identical; in fact the picture 8 does not reproduce the object 5 seen under another angle, but merely its picture, which does away with all effects of parallaxis. In the device as shown, the pictures 6 and 8 are upside down one with reference to the other so that it is necessary to make the films pass in opposite directions as shown by the arrows $f$ and $f'$; if on the contrary the system 7 were capable of setting the picture straight, the pictures 6 and 8 would both appear upright and the films would have to move in the same direction which may be of advantage for further operation.

Of course it is possible to modify the relative arrangement of the films, the bipack film being put in front of the other; we may also use two bipack films when a four color projection is called for.

The view taking camera is easy to execute as it may be considered as constituted by two cameras arranged one behind the other, the driving means being of course in perfect synchronism.

Fig. 3 shows diagrammatically such a camera, in which we have assumed, by way of example, that the optic system 7 sets the picture straight, so as to cause both pictures to be arranged in the same direction. The driving means 9 and 11 are controlled by the same motor 12 which provides perfect synchronism.

Although preferable to the arrangement of Fig. 1, the arrangement of Figs. 2 and 3 shows nevertheless certain drawbacks. If the numerals I, II, III, designate the clearnesses of the pictures on the films 1, 2, 3, II is smaller than I and whatever the transparency of the film 2 may be, III is smaller than II. It is true that this drawback may be partly removed by making use of films the sensitive layers of which are very thin and have a very fine grain. This would provide a clearness higher than that generally obtained to-day with bipack films.

However considerable improvement may be provided by the following arrangement shown in Fig. 4. As illustrated there is interposed between the optic system 7 and the film 2 a semi-transparent mirror 13 inclined at 45° and the film 3 is caused to move perpendicularly to the films 1 and 2 so as to receive the pictures formed by this mirror. Obviously in this case, I designating the clearness obtained on the film 1, the pictures obtained on the films 2 and 3 will show the same clearness II.

Lastly in the arrangement of Fig. 5, there is inserted a semi-transparent mirror 13 at 45° between the object glass 4 and the film 1 and the images produced by this mirror are received by the film 3 which advances perpendicularly to the films 1 and 2. In this case the films 1 and 3 both carry pictures having a clearness I and the film 2 alone carries pictures having a clearness II.

Fig. 6 shows diagrammatically in perspective and in a manner similar to Fig. 3, the manner of executing in practice the arrangement of Fig. 5. The references being the same in Figs. 5 and 6, it is not necessary to give any further explanation.

In the arrangements of Figs. 4 and 5 it is sufficient for film 1 alone to be transparent, which leads to an important economy.

On the other hand the film 3, supposed to be transparent, may be considered as the equivalent of the film 1. An optic system 14, shown in dotted lines in Fig. 5, arranged behind the film 3 and exactly similar to the optic system 7 will produce a picture on a fourth film 15. Under such conditions we obtain four films showing two by two clearness I and II without resorting to a bipack film.

One of the chief advantages of our invention resides in that it allows for selective view taking the use of ordinary films sold commercially such as blue-sensitive films, diapositive films, orthochromatic films and panchromatic films. The films used may also have the same or different sensitive layers and the same or different sizes. Thus the first film of the apparatus may be of standard size and the second film may be a narrow film.

What we claim is:

1. In a camera chiefly for color cinematographs the combination of a number of light sensitive surfaces arranged in succession in the path of the light beam, of which surfaces at least the first one is transparent, means for forming a first picture on the first surface and an optic system inserted between each transparent surface and the next surface and adapted to form an image of the picture formed on the transparent surface on the next surface.

2. In a camera for color cinematographs, the combination of a number of films selectively sensitive to light of different colors arranged in succession in the path of the light beam and all of which which have a further film to their rear are transparent, means for advancing the films, means for forming first pictures on the first film and an optic system inserted between each two successive films and adapted to form an image of the picture formed on the first of these films on the second of these films.

3. A camera for color cinematographs comprising a number of parallel films selectively sensitive to light of different colors arranged in succession in the path of the light beam and all of which which have a further film to their rear are transparent, means for advancing the films, means for forming first pictures on the first film and an optic system inserted between each two successive films and adapted to form an image of the picture formed on the first of these films on the second of these films.

4. A camera for color cinematographs comprising a number of parallel films selectively sensitive to light of different colors arranged in succession in the path of the light beam and all of which which have a further film to their rear are transparent, means for advancing the films in the same direction, means for forming first pictures on the first film and an optic system inserted between each two successive films and adapted to form an image of the picture formed on the first of these films on the second of these films, said image being set straight with reference to the picture on the first of the two successive films.

5. A camera for color cinematographs comprising a number of parallel films selectively sensitive to light of different colors arranged in succession in the path of the light beam and all of which which have a further film to their rear are transparent, at least one couple of the films forming a bipack film, means for advancing the films, means for forming first pictures on the first film and an optic system inserted between each two successive independent films and adapted to form an image of the picture formed on the first of these films on the second of these films.

6. A camera for color cinematographs comprising at least two parallel films selectively sensitive to light of different colors arranged behind one another in the path of the light beam and all of which are transparent which have a further film behind them, means for advancing the films synchronously through the light beam, means for forming first pictures on the first film, an optic system inserted between each transparent film and the next film for forming on the said next film an image of the picture formed on said transparent film, a semi-reflective surface arranged in the path of the light beam in front of at least one of the films, further films selectively sensitive to given colored lights adapted to receive the reflected image produced by said semi-reflective surfaces and means for advancing said further films.

7. A camera for color cinematographs comprising at least two parallel films selectively sensitive to light of different colors arranged behind one another in the path of the light beam and all of which are transparent which have a further film behind them, means for advancing the films synchronously through the light beam, means for forming first pictures on the first film, an optic system inserted between each transparent film and the next film for forming on the said next film an image of the picture formed on said transparent film, a semi-reflective surface arranged in the path of the light beam in front of at least one of the films, further films selectively sensitive to given colored lights adapted to receive the reflected image produced by said semi-reflective surfaces and of which at least one is transparent, an auxiliary optic system to the rear of at least one of said transparent further films, an auxiliary film behind said optic system adapted to receive the image of the picture on the transparent further film through the optic system and means for advancing said further and auxiliary films.

8. A camera for color cinematographs comprising at least two parallel films selectively sensitive to light of different colors arranged behind one another in the path of the light beam and all of which are transparent which have a further film behind them, means for advancing the films synchronously through the light beam, means for forming exactly similar pictures on said films, a semi-reflective surface arranged in the path of the light beam in front of at least one of the films, further films selectively sensitive to given colored lights adapted to receive the reflected image produced by said semi-reflective surfaces and means for advancing said further films.

JEAN IONESCO.
GEORGES LUCIEN VICTOR
JOSEPH PROUVOT.